July 3, 1962  E. OUELLETTE  3,041,695
FISHING LINE FASTENER
Filed June 20, 1960
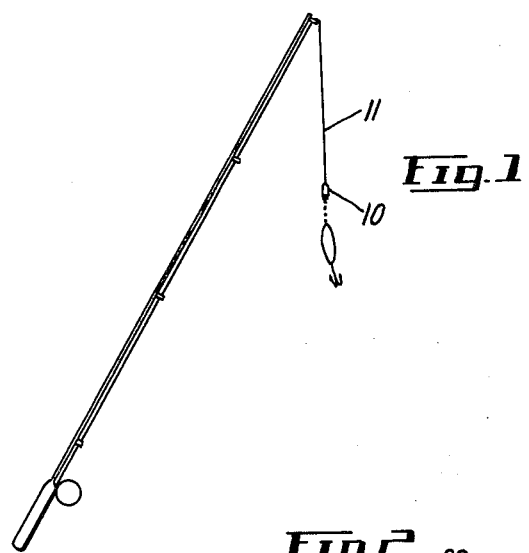
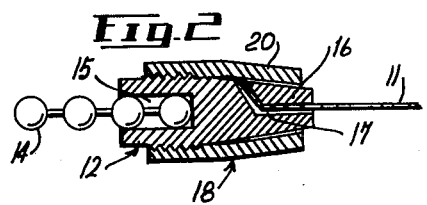
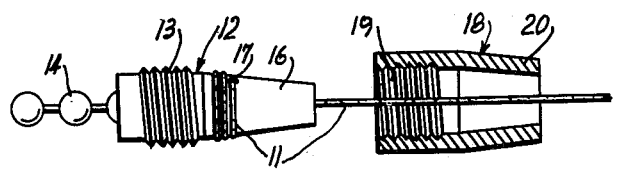
INVENTOR
ERNEST OUELLETTE
By Fetherstonhaugh & Co.
Attorneys

United States Patent Office 3,041,695
Patented July 3, 1962

3,041,695
FISHING LINE FASTENER
Ernest Ouellette, Rue Principale, Sub. 1, Brownsburg, Quebec, Canada
Filed June 20, 1960, Ser. No. 37,258
Claims priority, application Canada June 15, 1960
2 Claims. (Cl. 24—126)

The present invention relates to means for fastening a fishing line to a swivel.

The present procedure for fastening fishing lines to swivels is to secure the fishing line by means of a knot. With lines now in common use, which are made of nylon, this method has the disadvantage that if the knot is tied too tightly it damages the material of the line and exposes it to breakage, whereas if the knot is too loose it has a tendency to slip.

It is the object of the present invention to obviate these disadvantages by providing a fastener which offers complete security against slipping and which does not damage the line in any way, so as to avoid breaking of the line.

The fastener in accordance with the invention consists essentially of a body to which is attached the swivel, preferably by means of a ball chain or the like. The body has a frustoconical portion and a bore which opens axially at the small end of the frustoconical portion and which opens radially on the conical surface. A sleeve which has an internal portion complementary to the frustoconical portion of said body may be tightened on the body by means of a screw-thread. In use, the end of the fishing line is threaded through the bore and wrapped a few times on the frustoconical portion of the body. The sleeve is then fitted over the body and tightened so as to clamp securely the end of the fishing line.

An embodiment of the invention is illustrated by way of example in the accompanying drawings in which:

FIG. 1 is a general elevation of a fishing rod provided with a fastener according to the invention.

FIG. 2 is a longitudinal section of the fastener in assembled condition.

FIG. 3 is a longitudinal section of the fastener before complete assembly.

Referring to the drawings, FIG. 1 illustrates a fishing rod having a fastener 10 in accordance with the invention attached to the end of line 11.

Details of the construction of the fastener are shown in FIGS. 2 and 3. As illustrated therein the fastener consists of a body 12 having a cylindrical portion provided with a screw-thread 13. A ball chain 14 to which is attached a conventional swivel (not shown) is secured to the body 12 by being inserted in a cavity 15 in the end of the cylindrical portion, the body being heat crimped about the end of the ball chain. The body 12 has on its other side a frustoconical portion 16. A bore 17 extends axially from the small end of the frustoconical portion and then extends radially at an obtuse angle and opens on the conical surface of body portion 16.

The fastener further comprises a sleeve 18 having a cylindrical portion provided with an internal screw-thread 19 which matches the screw-thread 13 of body 12 and a frustoconical portion 20 having an internal taper matching the taper of the frustoconical portion 16 of body 12.

The device is used as follows: the end of line 11 is threaded through the bore 17 and is then wrapped three or four times about the frustoconical portion 16 of body 12. The sleeve is then fitted over the body 12 and is tightened on it by means of the screw-threads 13 and 19, so as to clamp the turns of the end of line 11 between the matching tapers of frustoconical portions 16 and 20. The line 11 is thus held securely in place without being damaged since it is clamped between smooth surfaces.

The body 12 and/or the sleeve 18 may be of plastic, metal or any other suitable material.

What I claim is:

1. A fastener for securing a fishing line to a swivel, comprising a body having a threaded cylindrical portion and a frustoconical portion having a conical surface, the swivel being securable to said cylindrical portion, said body having a bore extending axially from the end of said frustoconical portion and then radially at an angle and opening on the conical surface of said body through which a line extends to lie against said conical surface, and a sleeve having an internally threaded portion engageable with said threaded portion of said body and a frustoconical portion coaxial with and complementary to the frustoconical portion of said body and capable of coming substantially into full wedging contact therewith when said sleeve is tightened on said body, said two frustoconical portions being adapted to clamp the entire portion of line disposed therebetween.

2. A fastener according to claim 1, wherein said body has a cavity, and a chain is inserted and secured in said cavity, said chain being adapted to be attached to the swivel.

References Cited in the file of this patent

UNITED STATES PATENTS

| 231,751 | Bailey et al. | Aug. 31, 1880 |
| 1,471,173 | Kulier | Oct. 16, 1923 |
| 1,673,922 | Shonnard | June 19, 1928 |
| 1,836,480 | Loughridge | Dec. 15, 1931 |

FOREIGN PATENTS

| 494,015 | Germany | Mar. 17, 1930 |
| 423,183 | Italy | July 7, 1947 |